(12) United States Patent
Verma et al.

(10) Patent No.: US 11,898,682 B2
(45) Date of Patent: Feb. 13, 2024

(54) SYSTEM FOR SPACING AND FASTENING TUBULAR STRUCTURES

(71) Applicant: General Electric Company, Schenectady, NY (US)

(72) Inventors: Naleen Kumar Verma, Bengaluru (IN); Mario Alberto Bolaños Jimenez, Querétaro (MX); Arun Ramachandra, Bengaluru (IN); Jeffrey P. Darnell, Cincinnati, OH (US); Michael E. Sandy, Liberty Township, OH (US); José Torre, Querétaro (MX)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 27 days.

(21) Appl. No.: 17/451,053

(22) Filed: Oct. 15, 2021

(65) Prior Publication Data

US 2023/0118241 A1    Apr. 20, 2023

(51) Int. Cl.
*F16L 55/035* (2006.01)
*F16L 3/10* (2006.01)

(52) U.S. Cl.
CPC .............. *F16L 55/035* (2013.01); *F16L 3/10* (2013.01); *F05D 2220/32* (2013.01); *F05D 2230/60* (2013.01); *F05D 2260/96* (2013.01)

(58) Field of Classification Search
CPC ....... F16L 55/035; F16L 3/10; F05D 2220/32; F05D 2230/60; F05D 2260/96
USPC ......... 248/68.1, 69, 53, 62, 74; 60/261, 739; 285/124.2
See application file for complete search history.

(56) References Cited

U.S. PATENT DOCUMENTS

| 3,860,978 A | * | 1/1975 | Wirth | E03C 1/284 |
| | | | | 4/DIG. 16 |
| 3,933,377 A | * | 1/1976 | Arrowood | F16L 3/00 |
| | | | | 248/62 |
| 4,006,874 A | * | 2/1977 | McGee | F16L 3/123 |
| | | | | 248/55 |

(Continued)

FOREIGN PATENT DOCUMENTS

| DE | 102009050588 A1 | * | 5/2011 | ............. F16L 3/137 |
| EP | 2900565 B1 | | 2/2017 | |
| JP | 2002340091 A | * | 11/2002 | |

*Primary Examiner* — Kimberly T Wood
(74) *Attorney, Agent, or Firm* — Venable LLP; Elizabeth C. G. Gitlin; Michele V. Frank (57) ABSTRACT

A tube spacing and fastening system for a gas turbine engine includes a plurality of tubular structures, a wear sleeve, a spacer element, and a fastening element. The plurality of tubular structures provides a fluid flow to a component of the gas turbine engine. The wear sleeve is located around each of the plurality of tubular structures. The spacer element receives the plurality of tubular structures. The fastening element extends around the wear sleeves and is configured to secure the plurality of tubular structures to the spacer element. An interference between the fastening element and wear sleeves is configured to allow the fastening element to slide with respect to the wear sleeves and to provide a damping effect under gas turbine engine vibrations and operating conditions. A method of damping vibrations in the plurality of tubular structures includes allowing the fastening element to slide with respect to the wear sleeve.

11 Claims, 7 Drawing Sheets

(56) References Cited

U.S. PATENT DOCUMENTS

| | | | | |
|---|---|---|---|---|
| 4,143,709 A | * | 3/1979 | Cunningham | F28F 9/0135 165/172 |
| 4,393,998 A | * | 7/1983 | Allen | F16L 3/18 248/74.1 |
| 4,438,294 A | * | 3/1984 | Meltsch | H02G 15/013 174/DIG. 8 |
| 4,601,447 A | | 7/1986 | McFarland | |
| 4,913,386 A | | 4/1990 | Sugiyama | |
| 4,925,136 A | * | 5/1990 | Knott | F16L 3/237 248/62 |
| 4,971,268 A | * | 11/1990 | Dobrowski | F16L 3/08 244/135 R |
| 5,474,268 A | | 12/1995 | Yu | |
| 5,544,849 A | * | 8/1996 | Peterson | F16L 3/12 248/74.1 |
| 5,553,666 A | * | 9/1996 | Hartman | E21B 17/1035 166/62 |
| 5,755,013 A | * | 5/1998 | Fitch | F16L 3/237 29/447 |
| 5,901,756 A | | 5/1999 | Goodrich | |
| 8,079,560 B2 | * | 12/2011 | Blackwell | B60R 11/00 403/53 |
| 8,230,555 B2 | | 7/2012 | Browne et al. | |
| 8,569,624 B2 | * | 10/2013 | Eshima | H02G 3/32 174/115 |
| 8,770,537 B2 | * | 7/2014 | Go | F16L 55/035 248/62 |
| 8,853,532 B2 | * | 10/2014 | Eshima | H02G 3/03 248/74.2 |
| 9,062,802 B2 | * | 6/2015 | Lairie | B65D 63/1009 |
| 9,212,677 B2 | | 12/2015 | Owen | |
| 9,217,519 B2 | | 12/2015 | Masters et al. | |
| 9,856,998 B2 | | 1/2018 | Cripps, II | |
| 11,458,909 B2 | * | 10/2022 | Lenagh | B60R 16/0215 |
| 11,532,929 B2 | * | 12/2022 | Robinson | F16L 3/22 |
| 2005/0264012 A1 | * | 12/2005 | Ignaczak | F16L 21/065 285/417 |
| 2006/0201565 A1 | * | 9/2006 | Coupe | E03F 3/02 138/108 |
| 2011/0147543 A1 | * | 6/2011 | Koga | H02G 3/30 248/69 |
| 2011/0290951 A1 | * | 12/2011 | Guthke | H02G 3/32 248/68.1 |
| 2012/0112014 A1 | * | 5/2012 | Eshima | H02G 3/32 248/68.1 |
| 2016/0215562 A1 | * | 7/2016 | Sylvester | E06C 7/14 |
| 2019/0309672 A1 | * | 10/2019 | Moetakef | F16F 15/085 |

* cited by examiner

902 Providing a spacer element

904 Providing each of a plurality of tubular structures with a wear sleeve

906 Engaging the plurality of tubular structures to the spacer element

908 Spatially separating the tubular structures from one another

910 Distributing stress in the tubular structures

912 Extending a fastening element around a portion of the outer surface of the wear sleeve of the tubular structures

914 Fastening the tubular structures to the spacer element in an adaptively spaced configuration

FIG. 13

SYSTEM FOR SPACING AND FASTENING TUBULAR STRUCTURES

TECHNICAL FIELD

The present disclosure relates to spacing and fastening systems for tubular structures deployed in engineering assemblies. In particular, the present disclosure relates to spacer elements for supporting and separating tubular structures deployed in engineering assemblies.

BACKGROUND

Gas turbine engines and other engineering assemblies typically include arrays or banks of tubes or pipes deployed in several locations for transport of liquids and gaseous products. Tubes or pipes are typically bundled using permanently joined spacer elements such as brazed or welded blocks and tabs.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

DETAILED DESCRIPTION

Features, advantages, and embodiments of the present disclosure are set forth or apparent from a consideration of the following detailed description, drawings, and claims. Moreover, it is to be understood that the following detailed description are exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the spirit and scope of the present disclosure.

Reference will now be made in detail to present embodiments of the disclosed subject matter, one or more examples of which are illustrated in the accompanying drawings. The detailed description uses numerical and letter designations to refer to features in the drawings. Like or similar designations in the drawings and description have been used to refer to like or similar parts of the disclosed subject matter. As used herein, the terms "first," "second," "third," "fourth," and "exemplary" may be used interchangeably to distinguish one component from another and are not intended to signify location or importance of the individual components.

Further, to more clearly and concisely describe and point out the subject matter, the following definitions are provided for specific terms, which are used throughout the following description and the appended claims, unless specifically denoted otherwise with respect to a particular embodiment.

The term "tube spacing and fastening system" as used in the context refers to a group of interacting or interrelated elements that act according to a set of rules to form a unified whole deployed to spatially separate tubes or its equivalents, such as pipes, rods, bars or any tubular structure and at the same time, to fasten them together. The detailed description uses numerical and letter designations to refer to features of tube spacing and fastening systems in the drawings. Like or similar designations in the drawings and description have been used to refer to like or similar tube spacing and fastening systems. As used herein, the numerals "20," "40," "60," "80," "150," and "400" may be used interchangeably to distinguish one system from another and are not intended to signify location or importance of the individual systems.

The term "spacer element" as used in the context refers to a device or piece used to create or maintain a desired amount of space between two or more objects. The detailed description uses numerical and letter designations to refer to features of spacer elements in the drawings. Like or similar designations in the drawings and description have been used to refer to like or similar spacer elements. As used herein, the numerals "22," "42," "62," "82," "182," and "422" may be used interchangeably to distinguish one spacer element from another and are not intended to signify location or importance of the individual spacer elements.

The term "core part" as used in the context refers to a central and foundational portion of a spacer element, usually distinct from the enveloping portions by a difference in nature or structure or function. The detailed description uses numerical and letter designations to refer to features of core parts in the drawings. Like or similar designations in the drawings and description have been used to refer to like or similar core parts. As used herein, the numerals "29," "45," "86," and "186" may be used interchangeably to distinguish one core part from another and are not intended to signify location or importance of the individual core parts.

The term "fastening element" as used in the context refers to a device or component that structurally joins or affixes two or more objects together. In general, fasteners are used to create non-permanent joints, that is, joints that can be removed or dismantled without damaging the joining components. The detailed description uses numerical and letter designations to refer to features of fastening elements in the drawings. Like or similar designations in the drawings and description have been used to refer to like or similar fastening elements. As used herein, the numerals "23," "46," "72," "92," and "192" may be used interchangeably to distinguish one fastening element from another and are not intended to signify location or importance of the individual fastening elements.

The term "raised slot edge" as used in the context refers to elevated sides of a narrow, elongated depression, groove, notch, slit, or aperture, especially a narrow opening on a spacer element for receiving or admitting something of a planar dimension such as a fastening strap or band. The detailed description uses numerical and letter designations to refer to features of raised slot edges in the drawings. Like or similar designations in the drawings and description have been used to refer to like or similar raised slot edges. As used herein, the numerals "54," and "68" may be used interchangeably to distinguish one raised slot edge from another and are not intended to signify location or importance of the individual raised slot edges.

The term "top end" as used in the context refers to the highest or uppermost point, portion, or surface of a spacer element. The detailed description uses numerical and letter designations to refer to features of top ends in the drawings. Like or similar designations in the drawings and description have been used to refer to like or similar top ends. As used herein, the numerals "37," and "65" may be used interchangeably to distinguish one top end from another and are not intended to signify location or importance of the individual top ends.

Similarly, the term "bottom end" as used in the context refers to the lowest or lowermost point, portion, or surface of a spacer element. The detailed description uses numerical and letter designations to refer to features of bottom ends in the drawings. Like or similar designations in the drawings and description have been used to refer to like or similar bottom ends. As used herein, the numerals "38," "66," and "438" may be used interchangeably to distinguish one bottom end from another and are not intended to signify location or importance of the individual bottom ends.

The term "top tray slot" as used in the context refers to a narrow, elongated depression, groove, notch, slit, or aperture, especially a narrow opening on top of a spacer element for receiving or admitting something of a planar dimension such as a fastening strap or a band. The detailed description uses numerical and letter designations to refer to features of top tray slots in the drawings. Like or similar designations in the drawings and description have been used to refer to like or similar top tray slots. As used herein, the numeral "67" may be used interchangeably to distinguish one top tray slot from another and is not intended to signify location or importance of the individual top tray slots.

The term "tube outer surface" as used in the context refers to an outermost or uppermost or exterior boundary or layer or area of a tube. The detailed description uses numerical and letter designations to refer to features of tube outer surfaces in the drawings. Like or similar designations in the drawings and description have been used to refer to like or similar tube outer surfaces. As used herein, the numerals "26," "47," and "73," may be used interchangeably to distinguish one tube outer surface from another and are not intended to signify location or importance of the individual tube outer surfaces.

The tube spacing and fastening system of the present disclosure provides for coupling multiple tubular structures together. The tube spacing and fastening system of the present disclosure couples or connects multiple tubular structures together without brazes or welds. In some examples, the tube spacing and fastening system may include a spacer element and a fastening band for coupling the multiple tubular structures. The spacer element functionally addresses an engineering contradiction of holding the tubular structures together and, at the same time, spatially separating them from another. The fastening band extends around the outer surfaces of the tubular structures and fastens them to the spacer element, loosely below a predetermined temperature range and conversely, tightly above the predetermined temperature range. A wear sleeve may be provided to enhance the life of the tube spacing and fastening system and the tubular structures.

The spacer element is also configured to distribute stress in each of the plurality of tubular structures in relation to the spacer element. Surface features may be present on the spacer. Further, the tube spacing and fastening system of the present disclosure may allow for coupling of multiple tubular structures in a manner that reduces, prevents, or eliminates high stress concentrations.

Gas turbine engine installations include tubes or conduits carrying fuel, oil, hydraulic fluids ore pressurized air. The tubes or conduits are usually bundled together to carry the fluid within or across several compartments and components (such as fan, compressor, turbine) of the engine under a nacelle or to discharge the fluid overboard. Tube or pipe assemblies deployed in engineering assemblies found in aircraft engines, heat exchangers, and nuclear power structures typically bundle the tubes using spacers. The spacers may be permanently joined to the tube bundle, for example, with brazed or welded blocks and tabs. For example, a typical tube assembly of exemplary tubular structures may include, in a non-limiting manner, tubes, pipes, rods, bars, or combinations thereof. In one instance, an exemplary tube assembly may include a bank of exemplary tubes permanently joined (e.g., brazed or welded) in a clamp forming a clamp-tube assembly. In one instance, an exemplary tube assembly may include a bank of exemplary tubes permanently joined (e.g., brazed or welded) in a spacer forming a permanently joined spacer-tube assembly.

Figure 1:
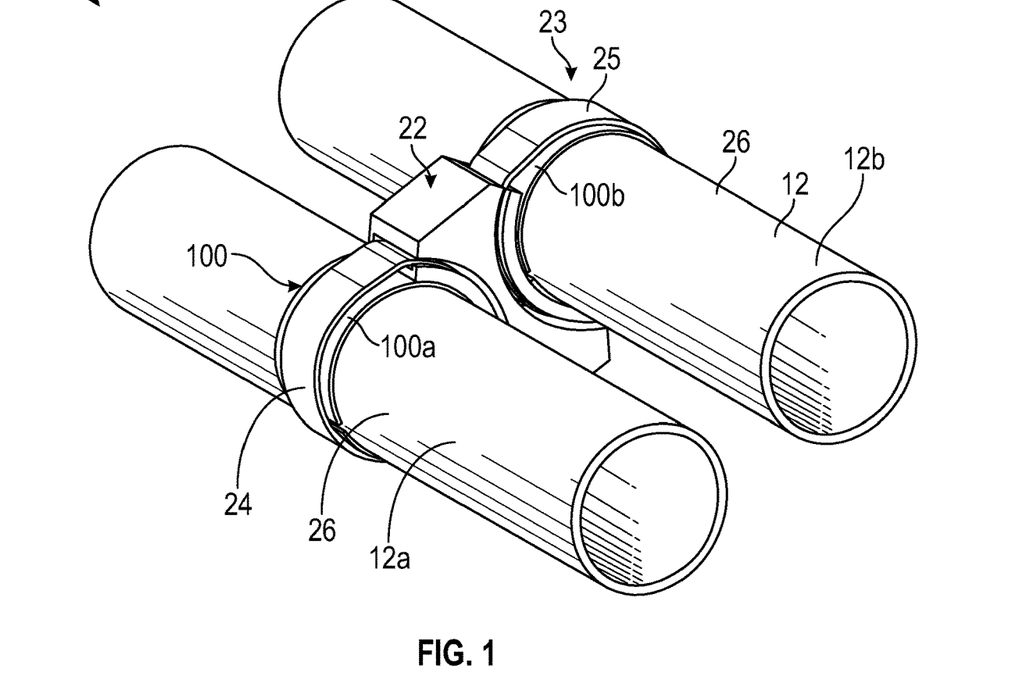
FIG. 1 shows a schematic, perspective view of a tube spacing and fastening system for tubular structures, according to an embodiment of the present disclosure.

FIG. 1 shows a schematic, perspective view of a tube spacing and fastening system 20 for tubular structures 12, such as tubes, pipes, rods and bars. The tubular structures 12 may be those typically found in engineering assemblies associated with aircraft engines. Referring to FIG. 1, a bank of exemplary tubular structures 12 is assembled in the tube spacing and fastening system 20. The tube spacing and fastening system 20 includes a spacer element 22 configured to engage the tubular structures 12 and spatially separate a first tubular structure 12a from a second tubular structure 12b. The spacer element 22 may spatially separate the exemplary tubular structures 12 and distribute stress in the tube spacing and fastening system 20. Each of the tubular structures 12 may include a wear sleeve 100. For example, the first tubular structure 12a may include a first wear sleeve 100a and the second tubular structure 12b my include a second wear sleeve 100b. The wear sleeve 100 may be located around an outer surface 26 of the tubular structures 12.

A fastening element 23 is configured to fasten the tubular structures 12 to the spacer element 22. The fastening element 23 may extend around at least a portion of each wear sleeve 100. The fastening element 23 may include a first portion 24 and a second portion 25. For example, the first portion 24 may extend around at least a portion of the first wear sleeve 100a of the first tubular structure 12a. The second portion 25 may extend around at least a portion of the second wear sleeve 100b of the second tubular structure 12b.

The fastening of the tubular structures 12 to the spacer element 22 may be in an adaptively spaced configuration. In one instance, the adaptively spaced configuration may include a first length of the fastening element 23 below a predetermined temperature range and a second length of the fastening element 23 above the predetermined temperature range, such that the first length is different from the second length. Further, in another instance, the adaptively spaced configuration may include a first configuration, wherein the tubular structures 12 are movably spaced around the spacer element 22 and a second configuration, wherein the tubular structures 12 are immovably spaced around the spacer element 22.

Figure 2:
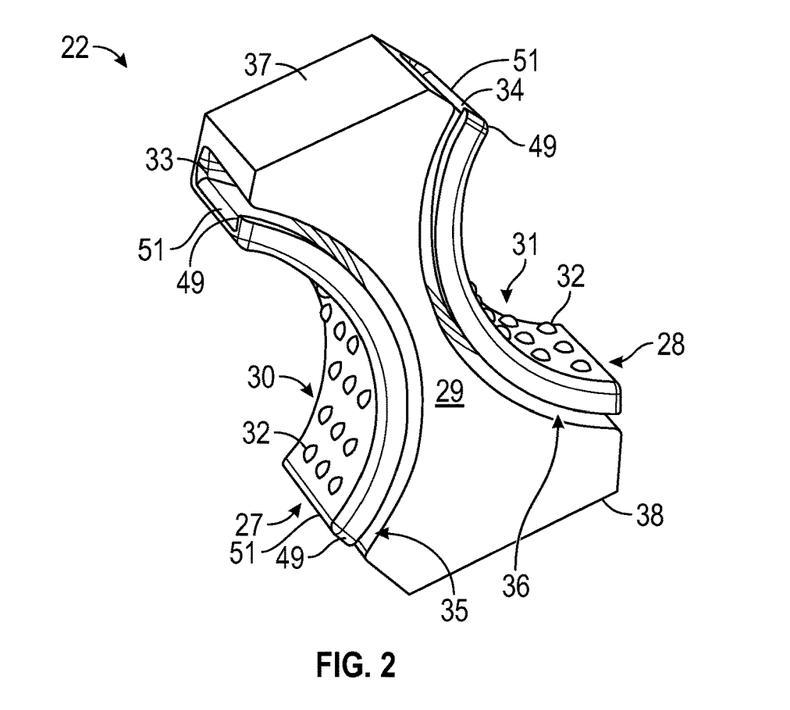
FIG. 2 shows a schematic, perspective view of a spacer for the tube spacing and fastening system of FIG. 1, according to an embodiment of the present disclosure.

FIG. 2 shows a schematic, perspective view of the spacer element 22. The spacer element 22 may include two opposing faces, a first cradle bracket 27 and a second cradle bracket 28, and a core part 29. The first cradle bracket 27 and the second cradle bracket 28 separated by the core part 29 positioned in the center of the spacer element 22 and in between the first cradle bracket 27 and the second cradle bracket 28. The first cradle bracket 27, the second cradle bracket 28, and/or the core part 29 may be concave or may be any shape configured to complement the shape of the tubular structure 12. In one instance, the core part 29 may be a double-concave core part. The spacer element 22 may be a spacer block and may be a solid block. The first cradle bracket 27 and the second cradle bracket 28 may be formed in the body of the spacer element 22.

With continued reference to FIG. 2, a first contact surface 30 may engage the corresponding first tubular structure 12a (FIG. 1) at the first cradle bracket 27 and a second contact surface 31 may engage the corresponding second tubular structure 12b (FIG. 1) at the second cradle bracket 28. The first contact surface 30, the second contact surface 31, or both, may include a number of exemplary surface features 32, such as, for example, but not limited to, indentations or protrusions.

Going into more detail, the spacer element 22 employs the first cradle bracket 27 configured to engage the first tubular structure 12a (FIG. 1) and the second cradle bracket 28 configured to engage the second tubular structure 12b (FIG. 1). The core part 29 spatially separates the first cradle bracket 27 from the second cradle bracket 28, and, thereby, spatially separates the first tubular structure 12a engaged in the first cradle bracket 27 and the second tubular structure 12b engaged in the second cradle bracket 28. The spacer element 22 further includes a first recess 33 on one side, carved between the first cradle bracket 27 and a first corresponding surface 35 of the core part 29. In a similar manner, the spacer element 22 further includes a second recess 34 on the other side, carved between the second cradle bracket 28 and a second corresponding surface 36 of the core part 29.

The first recess 33 is configured to accommodate the first portion 24 (FIG. 1) of the fastening element 23 and the second recess 34 is configured to accommodate the second portion 25 (FIG. 1) of the fastening element 23. Each of the first recess 33 and the second recess 34 includes a projected lip 49 and a seat 51 that, together, keep the fastening element 23 within the first recess 33 and the second recess 34 and prevent the fastening element 23 from slipping out of the recess, under stress. The first cradle bracket 27, the second cradle bracket 28, and the core part 29 may join at a top end 37 of the spacer element 22 and at a bottom end 38 of the spacer element 22.

In an embodiment of the current disclosure, the fastening element 23 may be a wrap-around band made of a shape memory alloy (SMA). Referring to FIG. 1, when the fastening element 23 is a shape memory alloy band, the fastening element 23 may assume a first configuration (length) for tightly supporting the tubular structure 12 at a temperature above an overall transition temperature and may assume a second configuration (length) for loosely engaging the tubular structure 12 below the overall transition temperature. Thus, for the tubular structure 12 to engage with the spacer element 22, the shape memory alloy band may generate high radial compressive force that swages the wear sleeve 100 positioned on the underlying tubular structure 12. That is, the shape memory alloy (SMA) band, in one embodiment of the current disclosure, generates high radial compressive force and swages (compresses or shrinks) the underlying wear sleeve 100 to locally yield at the static metal-to-metal joints by swaging a number of surface features (protrusions or indentations or teeth or dimples or ridges) configured on the contact surfaces and, at the same time, remain in continued contact with the spacer element 22. Any shape-memory alloy may be used in the present disclosure as long as it demonstrates an adequate shape-memory effect, such as, for example, a nickel-titanium alloy.

Figure 3:
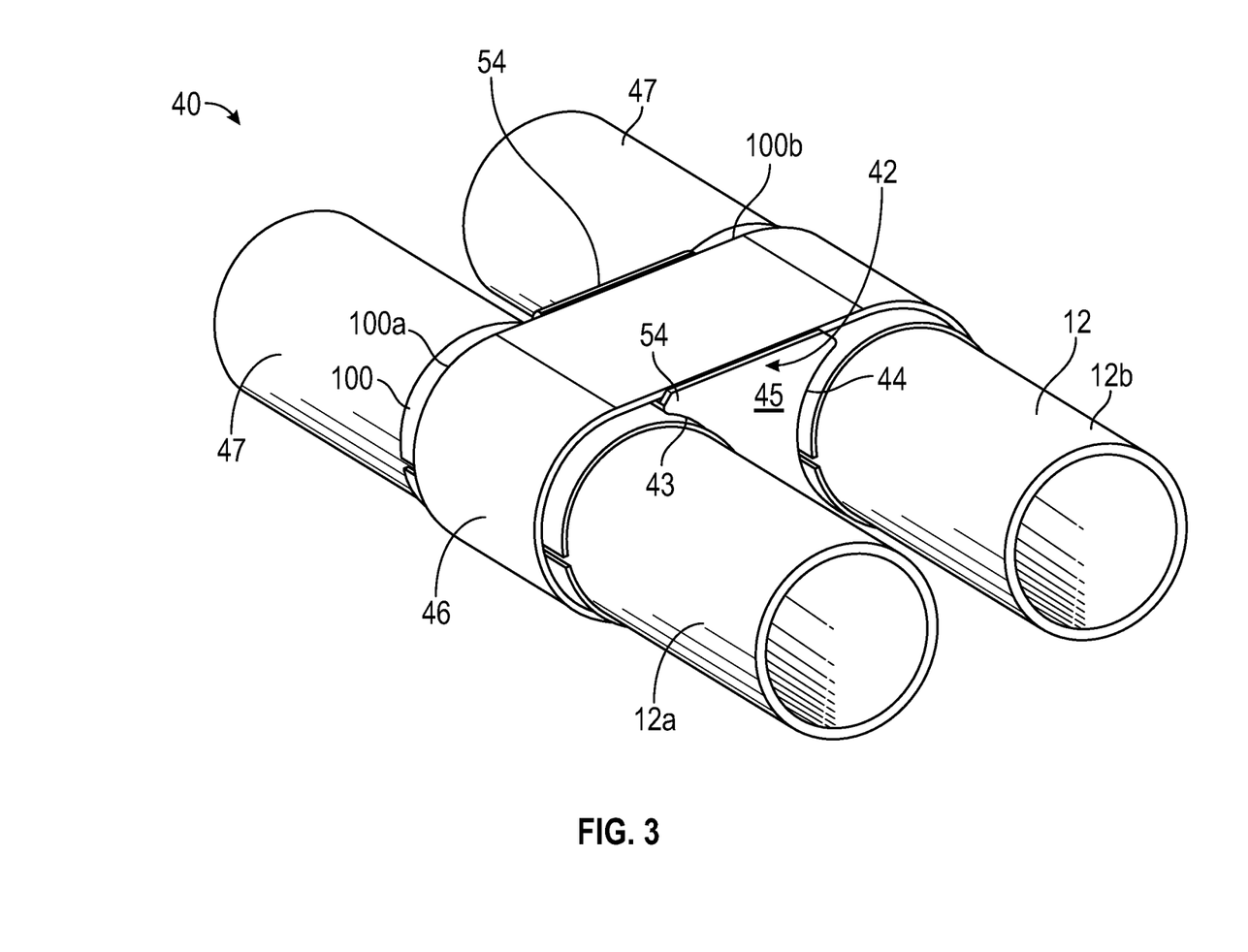
FIG. 3 shows a schematic, perspective view of a tube spacing and fastening system for tubular structures, according to an embodiment of the present disclosure.

FIG. 3 shows a schematic, perspective view of a tube spacing and fastening system 40 for the tubular structure 12, according to an embodiment of the present disclosure. Referring to FIG. 3, the tube spacing and fastening system 40 includes a spacer element 42 with two opposing faces shaped as a first cradle bracket 43 and a second cradle bracket 44 separated by a core part 45. In an embodiment of the current disclosure, outer surfaces of the first cradle bracket 43 and the second cradle bracket 44 may be marked with exemplary surface features including protrusions/indentations, such as described with respect to FIG. 2. A wear sleeve 100 may be located around an outer surface 47 of each of the tubular structures 12. That is, a first wear sleeve 100a may be located around a first tubular structure 12a and a second wear sleeve 100b may be located around a second tubular structure 12b. A fastening element 46 is extended around at least part of the wear sleeve on the outer surface 47 of each of the tubular structure 12 in the tube spacing and fastening system 40 to fasten the tubular structure 12 to the spacer element 42. In one instance, the fastening element 46 may be a shape memory alloy (SMA) band. Raised edges 54 may be provided on the spacer element 42. The raised edges 54 may maintain the fastening element 46 within a groove or slot (not visible) in the upper and lower surfaces of the spacer element 42.

In the tube spacing and fastening system 20 (FIGS. 1 and 2) and/or in the tube spacing and fastening system 40 (FIG. 3), additional stress distribution configurations may include specially contouring the first contact surface and the second contact surface between the tubular structure 12 and the first cradle bracket and the second cradle bracket. Accordingly, instead of full surface contact between a stiffer block (e.g., spacer element 22 or spacer element 42) and a thin-walled tube (e.g., tubular structure 12), which generates higher edge contact stress, the spacer element 22 or spacer element 42 may include exemplary surface features (e.g., surface features 32 of FIG. 2). The exemplary surface features may be protrusions (also known as 'beads') in one instance and may be indentations (also known as 'dimples') in another instance, or combinations thereof.

Figure 4:
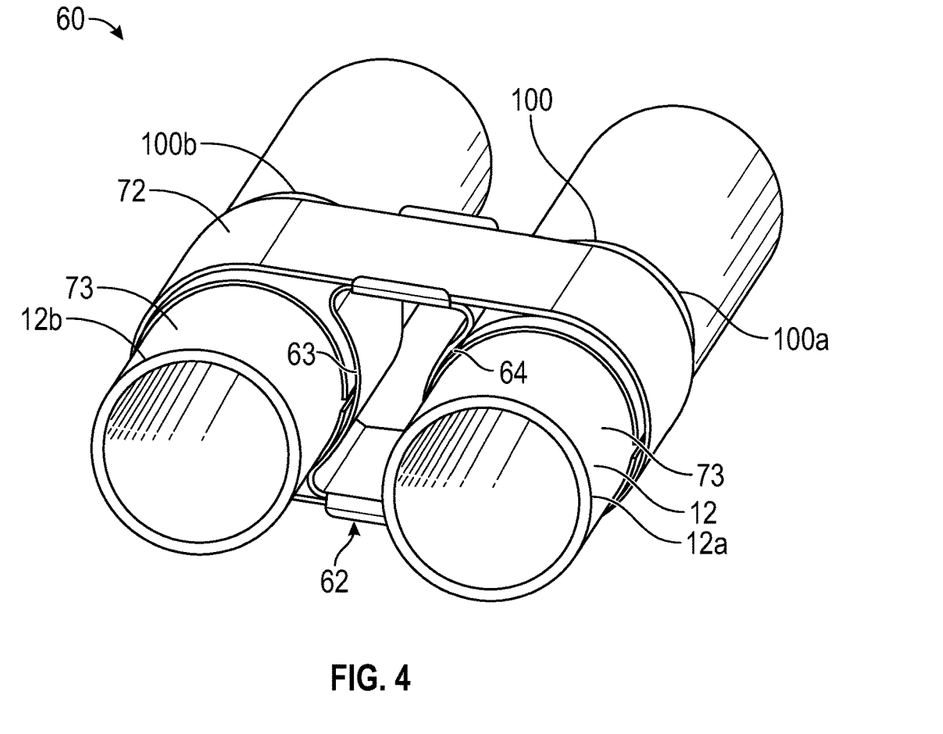
FIG. 4 shows a schematic, perspective view of a tube spacing and fastening system for tubular structures, according to an embodiment of the present disclosure.

FIG. 4 shows a schematic, perspective view of a tube spacing and fastening system 60 for the tubular structure 12, according to an embodiment of the present disclosure. Tube spacing and fastening system 60 includes a spacer element 62 with two opposing faces shaped as a first thin-walled bracket 63 and a second thin-walled bracket 64. In one embodiment of the disclosure, outer surfaces of the first thin-walled bracket 63 and the second thin-walled bracket 64 are marked with protrusions and/or indentations (not shown), such as described with respect to FIGS. 1 to 3. The thin-walled bracket 64 and the thin-walled bracket 63 may function as cradles, such as described with respect to FIGS. 1 to 3, such that the tube spacing and fastening system 60 of FIG. 4 includes a plurality of cradles (e.g., thin-walled bracket 64 and thin-walled bracket 63). A wear sleeve 100 may be located around an outer surface 73 of each of the tubular structures 12. That is, a first wear sleeve 100a may be located around a first tubular structure 12a and a second wear sleeve 100b may be located around a second tubular structure 12b. A fastening element 72, embodied as a shape memory alloy (SMA) band, is extended around the wear sleeve 100.

Figure 5:
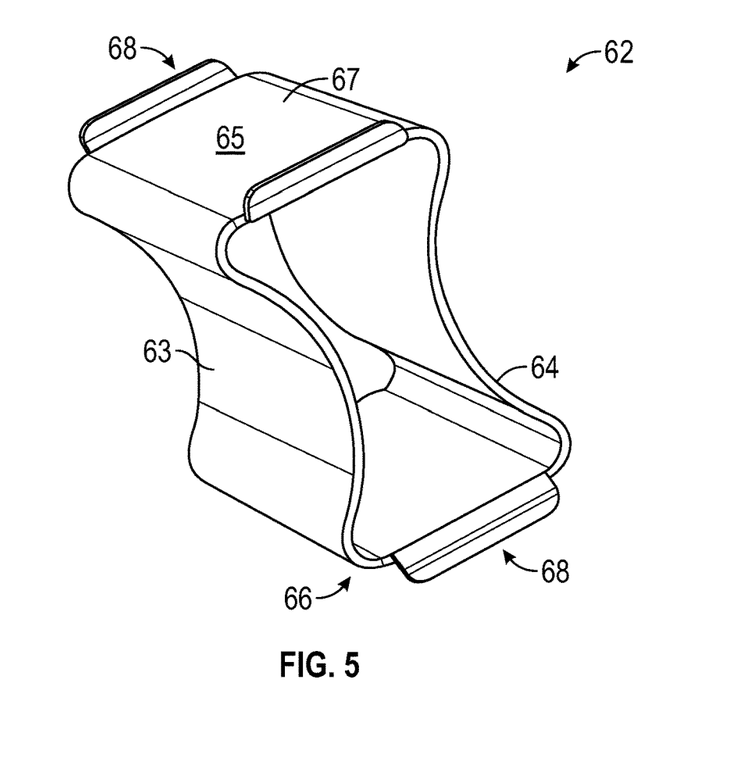
FIG. 5 shows a schematic, perspective view of a spacer for the tube spacing and fastening system of FIG. 4, according to an embodiment of the present disclosure.

FIG. 5 shows a schematic, perspective view of the spacer element 62. The spacer element 62 has a top end 65, a bottom end 66, and a top tray slot 67 with a raised slot edges 68. The first thin-walled bracket 63 and the second thin-walled bracket 64 are spatially separated by a hollow space in between the first thin-walled bracket 63 and the second thin-walled bracket 64. When extended around the tubular structures 12, the fastening element 72 may be located in the top tray slot 67 and a lower tray slot (not visible) on the bottom end 66. With reference to FIGS. 4 and 5, the first thin-walled bracket 63 is configured to engage the first tubular structure 12a and the second thin-walled bracket 64 is configured to engage the second tubular structure 12b.

Figure 6:
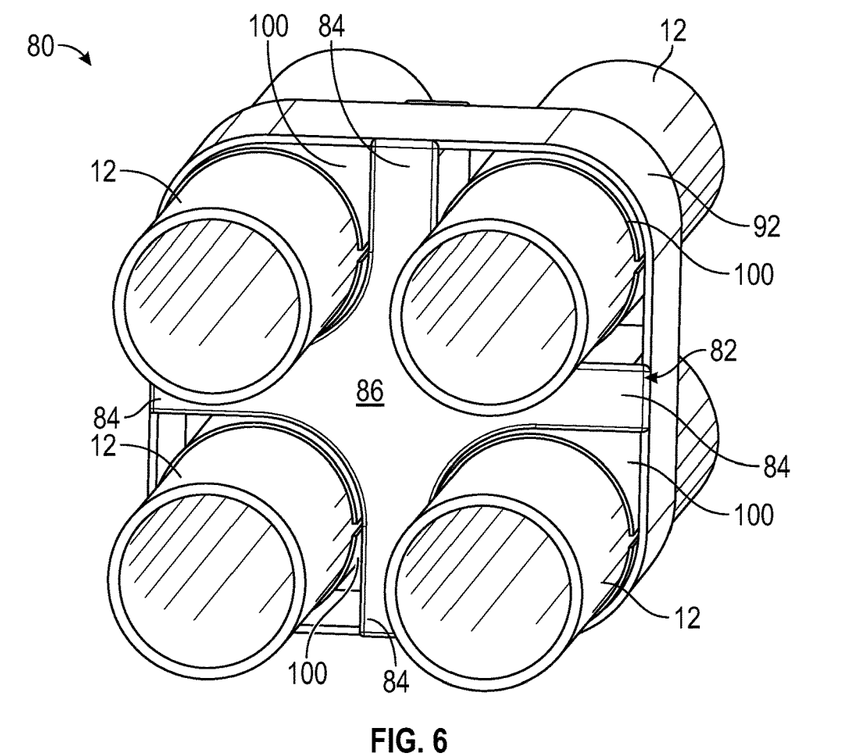
FIG. 6 shows a schematic, perspective view of a tube spacing and fastening system for tubular structures, according to an embodiment of the present disclosure.

FIG. 6 is a schematic, perspective view of a tube spacing and fastening system 80 for the tubular structures 12 in accordance with an embodiment of the current disclosure. The tube spacing and fastening system 80 includes a spacer element 82. The spacer element 82 may be any predetermined formation, such as a star formation, or cross formation, or any combination thereof. The spacer element 82 may include one or more radial arms 84 arranged in a star formation. Further, each of the radial arms 84 joins at a respective base with a core part 86. The radial arms 84 and the core part 86 may be integral and unitary or may be separate parts coupled or connected together. In the non-limiting example of FIG. 6, there are four exemplary radial arms 84 extending from the core part 86, but, in other embodiments, there may be fewer or more than four radial arms 84. The number of radial arms 84 may be selected based on the number of the tubular structures 12 desired to be coupled together. Around each of the tubular structures 12 may be a wear sleeve 100. A fastening element 92 may extend around the wear sleeve 100 of each of the tubular structures 12 to secure the tubular structures to the spacer element 82. As in prior examples, the fastening element 92 may be a shape memory alloy and/or the spacer element 82 may include one or more surface features to reduce stresses between the spacer element 82 and the tubular structures 12.

Figure 7:
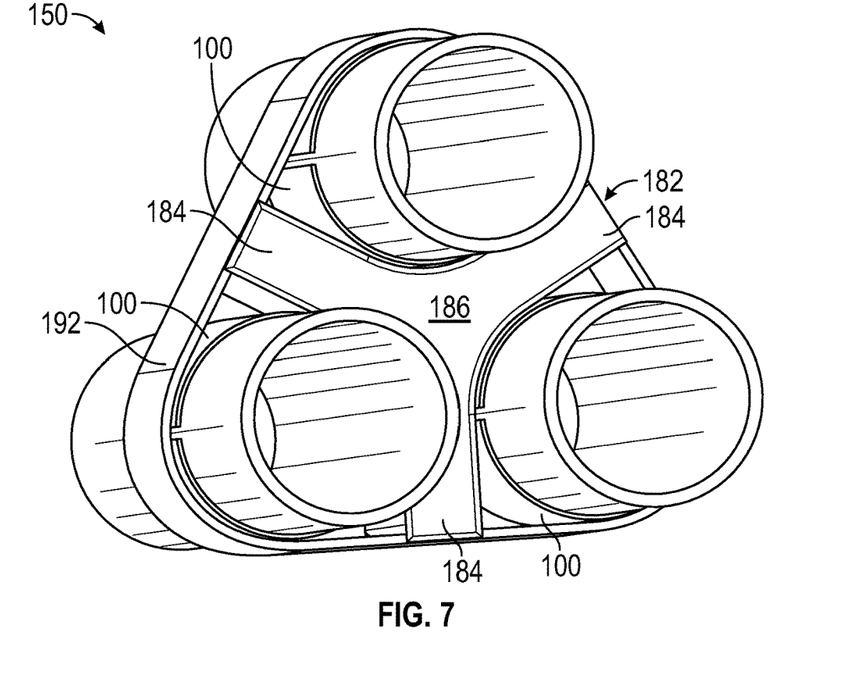
FIG. 7 shows a schematic, perspective view of a tube spacing and fastening system for tubular structures, according to an embodiment of the present disclosure.

FIG. 7 is a schematic, perspective view of a tube spacing and fastening system 150 for the tubular structures 12 in accordance with an embodiment of the current disclosure. The tube spacing and fastening system 150 includes a spacer element 182. The spacer element 182 includes three exemplary radial arms 184 arranged in a star formation. Each of the radial arms 184 joins at a respective base with a core part 186. The radial arms 184 and the core part 186 can be integral and unitary or can be separate parts coupled or connected together. Around each of the tubular structures 12 may be a wear sleeve 100. A fastening element 192 may extend around the wear sleeve 100 of each of the tubular structures 12 to secure the tubular structures to the spacer element 182. As in prior examples, the fastening element 192 may be a shape memory alloy and/or the spacer element 182 may include one or more surface features to reduce stresses between the spacer element 182 and the tubular structures 12.

Figure 8:
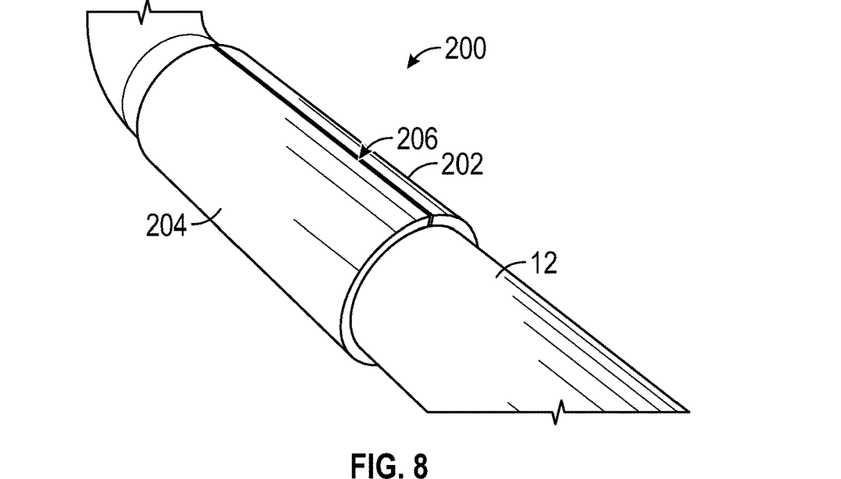
FIG. 8 shows a schematic, perspective view of a wear sleeve for tubular structures, according to an embodiment of the present disclosure.

FIG. 8 is a schematic, perspective view of a wear sleeve 200 around a tubular structure 12. The wear sleeve 200 may be utilized in any of the tube spacing and fastening systems described herein. That is, for example, any of the wear sleeves 100 may be a wear sleeve 200. The wear sleeve 200 may be formed of a first wear sleeve portion 202 and a second wear sleeve portion 204. A gap 206 may be provided between the first wear sleeve portion 202 and the second wear sleeve portion 204 such that the wear sleeve portions do not contact one another. In some examples a gap is present on a lower portion of the wear sleeve 200 such that the wear sleeve 200 is formed of two halves. In some examples, a single gap 206 is provided such that the wear sleeve 200 is generally C-shaped.

Figure 9:
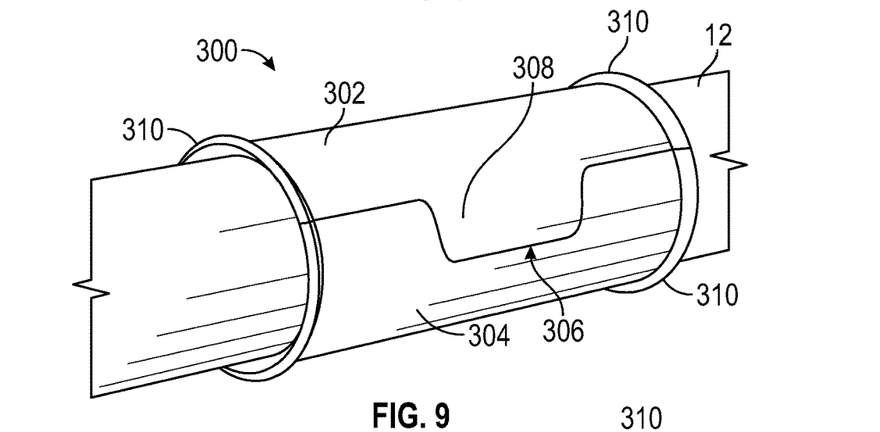
FIG. 9 shows a schematic, perspective view of a wear sleeve for tubular structures, according to an embodiment of the present disclosure.
Figure 10:
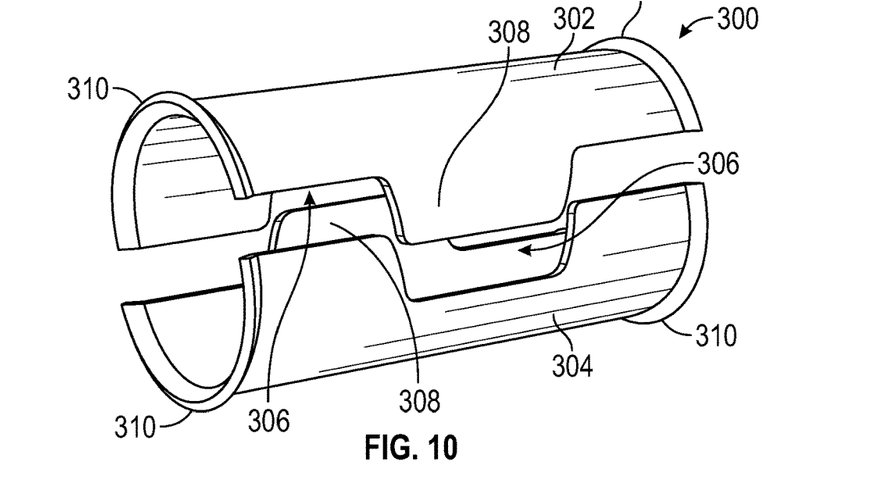
FIG. 10 shows a schematic, exploded, perspective view of the wear sleeve of FIG. 9, according to an embodiment of the present disclosure.

FIG. 9 is a schematic, perspective view of a wear sleeve 300 around a tubular structure 12. FIG. 10 is a schematic, exploded perspective view of the wear sleeve 300. The wear sleeve 300 may be utilized in any of the tube spacing and fastening systems described herein. That is, for example, any of the wear sleeves 100 may be the wear sleeve 300. The wear sleeve 300 may be formed of a first wear sleeve portion 302 and a second wear sleeve portion 304. Each of the first wear sleeve portion 302 and the second wear sleeve portion 304 may have a recess 306 and a protrusion 308. The protrusion 308 on the first wear sleeve portion 302 may be received in the recess 306 of the second wear sleeve portion 304. Likewise, the protrusion 308 on the second wear sleeve portion 304 may be received in the recess 306 of the first wear sleeve portion 302. A shoulder 310 may be provided at distal ends of each of the first wear sleeve portion 302 and the second wear sleeve portion 304. The shoulder 310 may operate to maintain a fastening element in a predetermined location along the longitudinal length of the tubular structures 12. Although should as a generally rectangular protrusion 308 and generally rectangular recess 306, any shape may provided so long as a mating relationship between the protrusion 308 and recess 306 is provided.

The wear sleeve 100, wear sleeve 200, and/or the wear sleeve 300 may provide an interface between the shape memory alloy fastening band and the tubular structures. The wear sleeves of the present disclosure may provide wear protection on the thin-walled tubular structures 12. In some examples, the wear sleeves of the present disclosure may be welded or brazed onto the tubular structure. In some examples, the wear sleeves of the present disclosure may operate as a snap-on or snap fit sleeve for placement around the tubular structures. In one example, the wear sleeve 200 is brazed to the tubular structure 12. In one example, the wear sleeve 300 is snapped on to the tubular structure.

In some examples, the wear sleeves of the present disclosure may be formed and/or designed to control the relative motion between the shape memory alloy band and the wear sleeve. The wear sleeves may provide a friction dampening effect to the tube spacing and fastening system. That is, the shape memory alloy band (e.g., the fastening element) does not make a permanent seal joint with the underlying wear sleeve. Instead, the amount of interference between the shape memory alloy band and the wear sleeves allow the shape memory alloy band to slide under various engine vibrations or conditions. This provides a friction damping effect. The friction damping developed in sliding joints adds to the overall energy dissipation of the shape memory alloy fastening element and further acts as a high performance vibration isolation system for tubular structures during engine imbalance or vibration.

Figure 11:
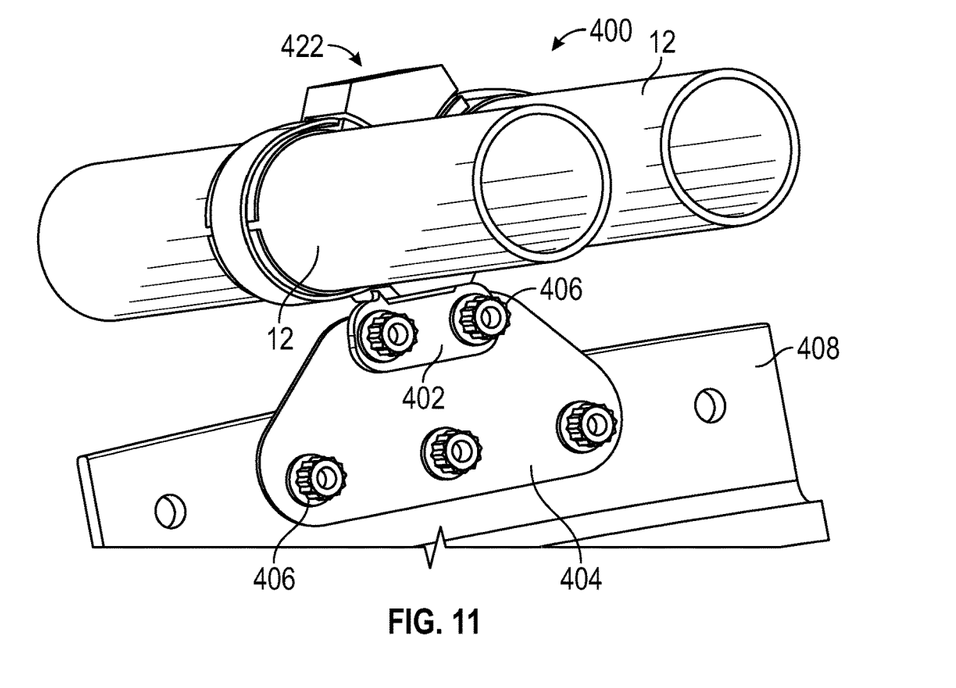
FIG. 11 shows a schematic, perspective view of a tube spacing and fastening system for tubular structures, according to an embodiment of the present disclosure.
Figure 12:
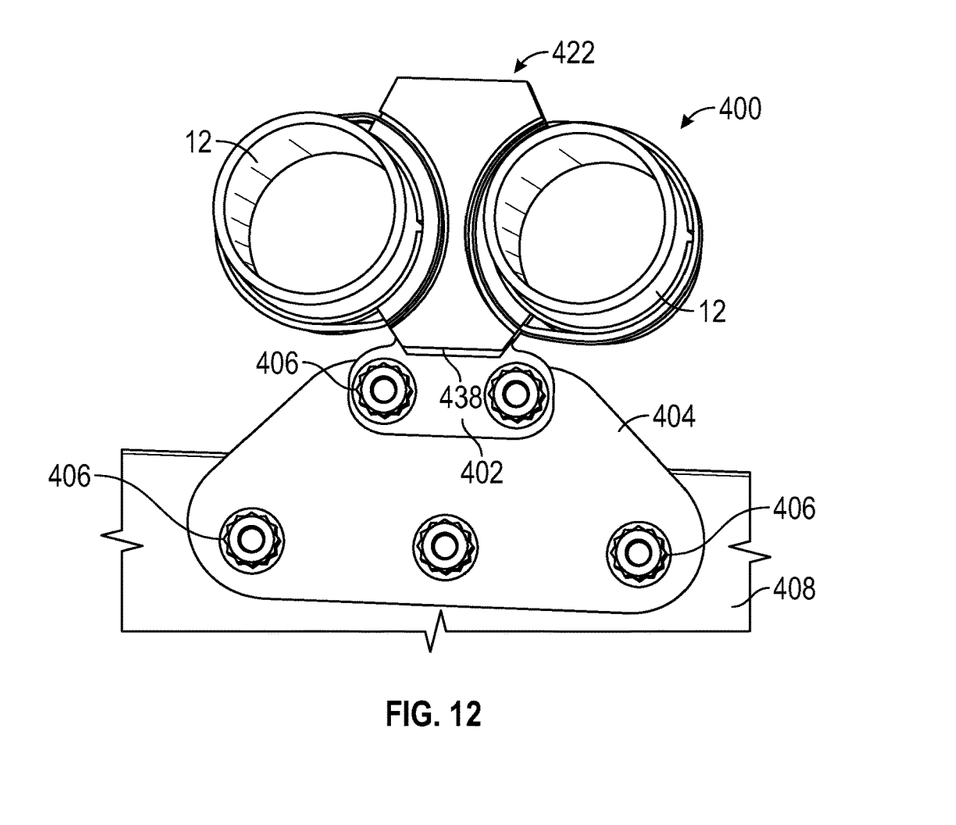
FIG. 12 shows a schematic, perspective view of the tube spacing and fastening system of FIG. 11, according to an embodiment of the present disclosure.

FIGS. 11 and 12 are schematic, perspective views of a tube spacing and fastening system 400. The tube spacing and fastening system 400 may be a tube bundle joint assembly with a support structure. The tube spacing and fastening system 400 may include a tube spacing and fastening system as described with respect to FIGS. 1 and 2 with the addition of a flange 402 extending from a bottom end 438 of a spacer element 422. The flange 402 may secure the tubular structures 12 to a secondary flange 404 that may be connected to another component 408. The connection may be provided with one or more fastening members 406.

Referring to FIGS. 1 to 12, the spacer elements and/or the wear sleeves may be additively manufactured. The spacer elements may be optionally contoured with dimples/ridges/beads through additive manufacturing. In other embodiments of the disclosure, other manufacturing methods, such as traditional subtractive manufacturing may be employed to produce the parts from typical machined blocks. The spacer elements may be formed of steel, Inconel®, or other suitable metals, such as nitinol (Ni—Ti), that meet high temperature applications as well as provide inherent elasticity to retain extending strength needed for braze-free and weld-free joints.

Any of the spacer blocks, fastening elements, wear sleeves, and spacing and fastening systems described herein may be combined with all or portions of the other spacer blocks, fastening elements, wear sleeves, and spacing and fastening systems described herein. Although a single spacing and fastening system is shown for the tubular structures 12, more may be provided along the length of the tubular structures 12. In such a manner, the tube spacing and fastening systems of the present disclosure may include a plurality of spacer blocks, wear sleeves, and fastening elements. The number may be selected based on the desired coupling and securement of the tubular structures 12.

Figure 13:
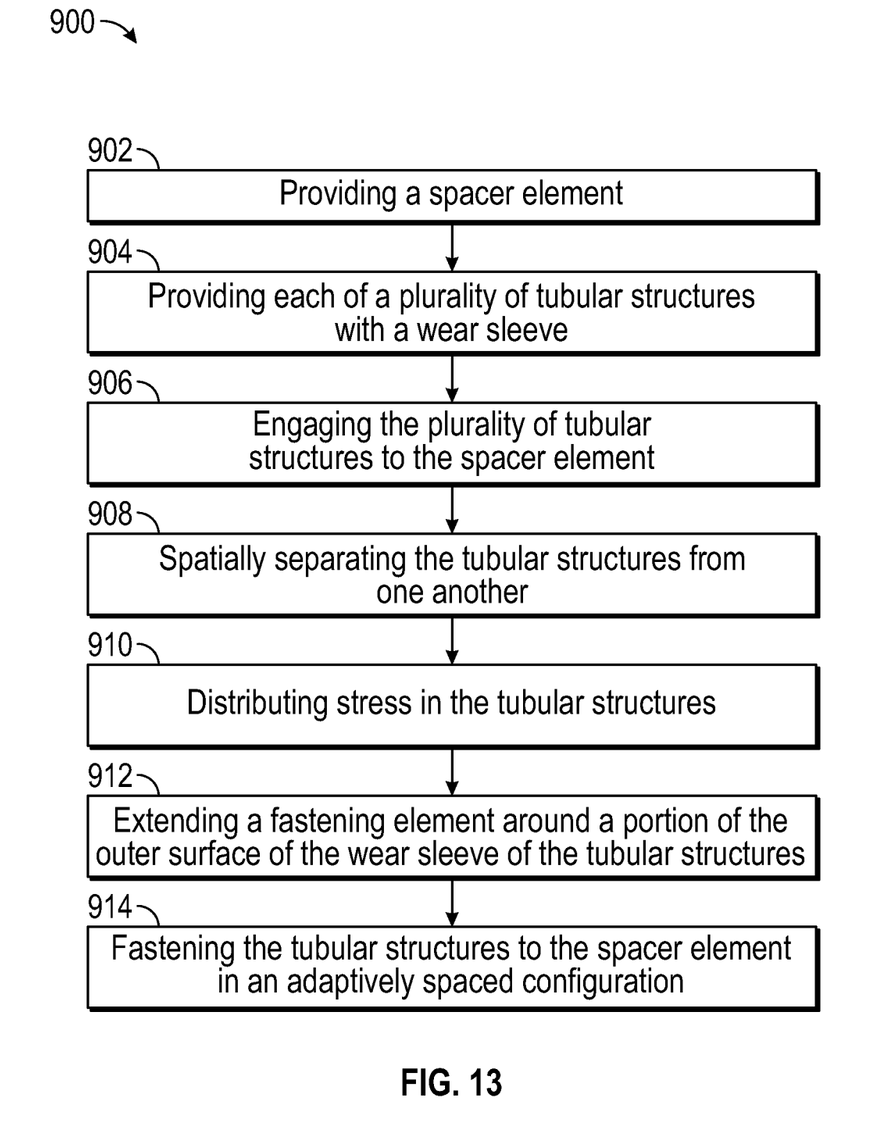
FIG. 13 shows a schematic flow diagram of a method of spacing and fastening a number of tubular structures, according to an embodiment of the present disclosure.

FIG. 13 is a block diagram of a method 900 of spacing and fastening tubular structures in accordance with one embodiment of the current disclosure. Referring to FIG. 13, the method 900 of spacing and fastening tubular structures, such as the tubular structures 12, includes in step 902, providing a spacer element, in step 904, providing each of a plurality of tubular structures with a wear sleeve, in step 906, engaging the plurality of tubular structures to the spacer element, in step 908, spatially separating the plurality of tubular structures from one another, and in step 910, distributing stress in the plurality of tubular structures. The method 900 further includes, in step 912, extending a fastening element around at least a portion of an outer surface of the plurality of tubular structures and in step 914, fastening the plurality of tubular structures to the spacer element in an adaptively spaced configuration.

In another embodiment of the current disclosure, the method 900 of spacing and fastening tubes further includes non-permanently engaging a first tubular structure to a first cradle bracket, engaging a second tubular structure to a second cradle such that the first tubular structure and the second tubular structure are spatially separated.

In one aspect of the disclosure, the tube spacing and fastening systems of the present disclosure use appropriate fastening elements to space and fasten the tubes and/or pipes with their structural integrity intact and without any cutting or shearing of the tubes and/or pipes. The spacing and fastening elements, as described in the embodiments of the current disclosure, thereby, improve on several critical operational performance factors including high stress concentration (Kt) at tube joints, difficulty in controlling uniformness of quality (owing to voids, limited braze/weld witness feature, and lack of coverage), low high-cycle fatigue (HCF) capability of material flux, geometric stress concentration, and rapid transition from flexible tube surfaces to stiff constraining elements.

Although described as engaging the tubular structures, the connection provided by the spacer element and the fastening element may be permanent in one instance. In other instances, the connection provided by the spacer element and fastening element to engage the tubular structures may be non-permanent. In some embodiments, the spacer element and the fastening element may be retrofit onto the tubing structures. The spacer element and the fastening element may be capable of being serviceable or replaceable, in the manufacturing plant or in the field.

The tube spacing and fastening systems of the present disclosure may include shape memory alloy (SMA) bands as a fastening element that provides an advantage over permanently joined spacing and fastening system configurations that sometime hold the tubes too tenaciously during tube reconstitution and/or tend to score the tubes during installation.

The tube spacing and fastening systems of the present disclosure provide a non-brazed, non-welded connection or coupling of tubes. The non-brazed, non-welded tube bundle configurations using shape memory alloy (SMA) bands for connecting the tubes and the spacer element may address issues associated with stress concentration of brazed or welded joints. Shape memory alloy (SMA) bands extended around tubes joining at the spacer element offer smooth stress distribution without any sudden transition of stiffness from spacer element to the tubes.

The tube spacing and fastening systems of the present disclosure may include multiple configurations of spacer elements including recessed block, solid unrecessed block, thin-walled, cross formation, or star formation spacer elements that provide a wide flexibility in the number of tubes to be engaged and adaptability in the design of the fastening elements to effectively support and spatially separate individual tubes in an assembled bundle. In some examples, the spacer element may be a thick-walled, solid block. Such a block may include surface features on the contact surfaces to reduce stresses between the thin-walled tubes and the thick-walled spacer element. In some examples, the spacer element may be thin-walled.

The tube spacing and fastening systems of the present disclosure may provide cost effective configurations that eliminate inspection and quality control issues related to permanently joined tube bundle assemblies such as brazed joints or welded joints. The tube spacing and fastening systems of the present disclosure improves 'Time on Wing' with by reducing typical field issues related to brazed or welded joints.

The tube spacing and fastening systems of the present disclosure inherently provide adaptive spacing and compact tube bundle routing for optimal tube packaging that save significant amount of space, cost, and weight. In one instance, the fastening element may be replaced without disregarding the tubes.

Further aspects of the present disclosure are provided by the subject matter of the following clauses.

A tube spacing and fastening system for a gas turbine engine includes a plurality of tubular structures configured to provide a fluid flow to a component of the gas turbine engine; a plurality of wear sleeves, each wear sleeve located around a respective one of the plurality of tubular structures; a spacer element configured to receive the plurality of tubular structures; and a fastening element configured to extend around the plurality of wear sleeves and configured to secure the plurality of tubular structures to the spacer element, wherein an interference between the fastening element and the plurality of wear sleeves is configured to allow the fastening element to slide with respect to the plurality of wear sleeves and to provide a damping effect under gas turbine engine vibrations and operating conditions.

The tube spacing and fastening system of any preceding clause, wherein each wear sleeve of the plurality of wear sleeves is welded or brazed to the respective one of the plurality of tubular structures.

The tube spacing and fastening system of any preceding clause, wherein each wear sleeve of the plurality of wear sleeves is snap fit onto the respective one of the plurality of tubular structures.

The tube spacing and fastening system of any preceding clause, wherein the plurality of wear sleeves controls relative motion of the fastening element and the plurality of tubular structures.

The tube spacing and fastening system of any preceding clause, wherein the fastening element does not form a permanent seal joint with the plurality of wear sleeves.

The tube spacing and fastening system of any preceding clause, wherein an interaction between the fastening element and the plurality of wear sleeves forms a vibration isolation system, the vibration isolation system configured to isolate the plurality of tubular structures from vibrations.

The tube spacing and fastening system of any preceding clause, wherein the fastening element is a shape memory alloy band.

The tube spacing and fastening system of any preceding clause, wherein the spacer element comprises a plurality of cradles, each cradle configured to receive one wear sleeve of the plurality of wear sleeves of the respective tubular structure of the plurality of tubular structures.

The tube spacing and fastening system of any preceding clause, wherein the plurality of wear sleeves contacts the fastening element, the plurality of tubular structures, and the spacer element.

The tube spacing and fastening system of any preceding clause, wherein each wear sleeve of the plurality of wear sleeves includes a shoulder on each distal end, the shoulder configured to maintain the fastening element at a predetermined longitudinal location on the plurality of tubular structures.

The tube spacing and fastening system of any preceding clause, wherein each wear sleeve of the plurality of wear sleeves is formed of two halves secured around an outer surface of the respective one of the plurality of tubular structures.

The tube spacing and fastening system of any preceding clause, wherein each half of the wear sleeve comprises a protrusion and a recess, and wherein the protrusion on a first half of the wear sleeve is configured to be received in the recess on a second half of the wear sleeve and the protrusion on the second half of the wear sleeve is configured to be received in the recess on the first half of the wear sleeve.

A method of damping vibrations in a tubular structure includes securing a wear sleeve on the tubular structure, locating a shape memory alloy band around the wear sleeve of the tubular structure, locating the wear sleeve of the tubular structure in a spacer element; securing the shape memory alloy band around the wear sleeve of the tubular structure, thus securing the tubular structure to the spacer element with the shape memory alloy band, and damping vibrations in the tubular structure caused by an operating condition of a gas turbine engine, wherein the damping is provided by allowing the shape memory alloy band to slide with respect to the wear sleeve.

The method of any preceding clause, further including welding or brazing the wear sleeve to the tubular structure.

The method of any preceding clause, further including snap fitting the wear sleeve to the tubular structure.

The method of any preceding clause, further including controlling relative motion of the shape memory alloy band with respect to the tubular structure.

The method of any preceding clause, wherein damping vibrations includes isolating the vibrations from the tubular structure.

The method of any preceding clause, wherein the wear sleeve contacts the shape memory alloy band, the tubular structure, and the spacer element.

The method of any preceding clause, wherein the tubular structure is a plurality of tubular structures and the wear sleeve is a plurality of wear sleeves, and wherein each tubular structure of the plurality of tubular structures has a wear sleeve of the plurality of wear sleeves.

The method of any preceding clause, wherein the spacer element receives each of the plurality of tubular structures and wherein the shape memory alloy band secures all of the plurality of tubular structures to the spacer element.

Although the foregoing description is directed to the preferred embodiments, it is noted that other variations and modifications will be apparent to those skilled in the art, and may be made without departing from the spirit or scope of the disclosure Moreover, features described in connection with one embodiment may be used in conjunction with other embodiments, even if not explicitly stated above.

The invention claimed is:

1. A tube spacing and fastening system for a gas turbine engine, the tube spacing and fastening system comprising:
 a plurality of tubular structures configured to provide a fluid flow to a component of the gas turbine engine;
 a plurality of wear sleeves, each wear sleeve located around a respective one of the plurality of tubular structures;
 a fastening element configured to extend around the plurality of wear sleeves;
 a spacer element comprising:
  a plurality of brackets, each bracket configured to receive a respective wear sleeve of the plurality of wear sleeves;
  a slot configured to receive the fastening element; and
  a raised edge adjacent the slot, the raised edge configured to maintain the fastening element within the slot,
 wherein the fastening element is configured to secure the plurality of tubular structures to the spacer element,
 wherein an interference between the fastening element and the plurality of wear sleeves is configured to allow the fastening element to slide with respect to the plurality of wear sleeves and to provide a damping effect under gas turbine engine vibrations and operating conditions.

2. The tube spacing and fastening system of claim 1, wherein each wear sleeve of the plurality of wear sleeves is welded or brazed to the respective one of the plurality of tubular structures.

3. The tube spacing and fastening system of claim 1, wherein each wear sleeve of the plurality of wear sleeves is snap fit onto the respective one of the plurality of tubular structures.

4. The tube spacing and fastening system of claim 1, wherein the plurality of wear sleeves controls relative motion of the fastening element and the plurality of tubular structures.

5. The tube spacing and fastening system of claim 1, wherein the fastening element does not form a permanent seal joint with the plurality of wear sleeves.

6. The tube spacing and fastening system of claim 1, wherein an interaction between the fastening element and the plurality of wear sleeves forms a vibration isolation system, the vibration isolation system configured to isolate the plurality of tubular structures from vibrations.

7. The tube spacing and fastening system of claim 1, wherein the fastening element is a shape memory alloy band.

8. The tube spacing and fastening system of claim 1, wherein the plurality of wear sleeves contacts the fastening element, the plurality of tubular structures, and the spacer element.

9. The tube spacing and fastening system of claim 1, wherein each wear sleeve of the plurality of wear sleeves includes a shoulder on each distal end, the shoulder configured to maintain the fastening element at a predetermined longitudinal location on the plurality of tubular structures.

10. The tube spacing and fastening system of claim 1, wherein each wear sleeve of the plurality of wear sleeves is formed of two halves secured around an outer surface of the respective one of the plurality of tubular structures.

11. The tube spacing and fastening system of claim 10, wherein each half of the wear sleeve comprises a protrusion and a recess, and wherein the protrusion on a first half of the wear sleeve is configured to be received in the recess on a second half of the wear sleeve and the protrusion on the second half of the wear sleeve is configured to be received in the recess on the first half of the wear sleeve.

* * * * *